United States Patent [19]

Lacombe-Allard

[11] 4,057,702

[45] Nov. 8, 1977

[54] PROCESS AND PLANT FOR THE FRITTING OF CERAMIC PRODUCTS

[75] Inventor: Jean Francois Lacombe-Allard, Paris, France

[73] Assignee: Automatisme & Technique, Arcueil, France

[21] Appl. No.: 517,069

[22] Filed: Oct. 22, 1974

[30] Foreign Application Priority Data

Oct. 31, 1973 France .................. 73.38987
Sept. 18, 1974 France .................. 74.31573

[51] Int. Cl.² .................. H05B 9/06; C04B 35/64
[52] U.S. Cl. .................. 219/10.55 A; 34/1; 219/10.55 M; 264/25; 264/66; 432/13
[58] Field of Search .............. 219/10.55 A, 10.55 M, 219/10.55 R; 34/1; 432/13; 264/25, 125, DIG. 30, DIG. 36, DIG. 46, 22, 26, 66, DIG. 59, DIG. 25

[56] References Cited

U.S. PATENT DOCUMENTS

| 3,166,663 | 1/1965 | Fritz | 219/10.55 A |
| 3,261,959 | 7/1966 | Connell et al. | 219/10.55 A |
| 3,461,261 | 8/1969 | Lewis et al. | 219/10.55 A |
| 3,469,053 | 9/1969 | Levinson | 219/10.55 E |
| 3,560,347 | 2/1971 | Knapp et al. | 219/10.55 A |
| 3,597,566 | 8/1971 | Johnson et al. | 219/10.55 A |
| 3,701,872 | 10/1972 | Levinson | 219/10.55 E |
| 3,704,523 | 12/1972 | Guerga et al. | 219/10.55 A |
| 3,761,665 | 9/1973 | Naggo et al. | 219/10.55 A |

FOREIGN PATENT DOCUMENTS

| 2,037,783 | 12/1970 | France | 219/10.55 A |
| 1,184,877 | 1/1965 | Germany | 219/10.55 A |

Primary Examiner—Bruce A. Reynolds
Attorney, Agent, or Firm—Brown, Murray, Flick & Peckham

[57] ABSTRACT

This invention relates to the fritting of ceramic products, in particular ceramic products of small or of very small dimensions, for example those intended for use in the electronics industry.

A process for fritting ceramic products wherein the products to be fritted which have been preheated to a given temperature are directly exposed to a hyperfrequential electro-magnetic field to raise the products to a temperature which causes fritting.

3 Claims, 7 Drawing Figures

PROCESS AND PLANT FOR THE FRITTING OF CERAMIC PRODUCTS

This invention relates to the fritting of ceramic products, in particular ceramic products of small or of very small dimensions, for example those intended for use in the electronics industry.

A fritting operation, which has the purpose of affecting cohesion of particles forming a ceramic product, is usually carried out in furnaces wherein the product is heated by radiation from the internal surface of the furnace walls.

Ceramic products, in particular those intended for use in the electronics industry, are usually substances having high fritting temperature, such as refractory oxides of aluminum, barium, beryllium and zirconium.

The heating of such ceramic products by thermal radiation up to the fritting temperature requires the internal surfaces of the furnace to be raised to temperatures at least equal to the fritting temperature of the products, and these internal surfaces must therefore be constructed of high-quality refractory materials and incorporate an effective heat insulation against these internal surfaces and the external surfaces of the furnace.

Moreover, the high temperatures required, for example of the order of 1650° C when fritting alumina-based ceramic products, do not at present allow the internal surfaces of the furnace to be heated economically by means of electrical resistances, and the heating is therefore usually effected by means of flames, for example by burning a gaseous fuel.

The reverberatory chamber of such gas furnaces should be relatively large, and in particular should be relatively high. Therefore the refractory walls surrounding the reverberatory chamber which consist of high-quality materials must have a substantial volume, and consequently the heat insulation of the outer walls of the furnace must have an equally substantial volume.

Moreover, when it is intended to fire small ceramic products in a relatively large reverberatory chamber, the products which are to be fired should be supported on supports of equally high-quality materials in order to obtain an appropriate filling ratio of the reverberatory chamber.

For these reasons, the fritting of small ceramic products which undergo fritting at a high temperature involves the use of high-grade and expensive refractory products in an amount which is disproportionate compared to that of the material which is to be fired, and this increases the cost of the firing operation to an unacceptable degree.

Moreover, the known fritting processes have other disadvantages which affect the quality of the ceramic products manufactured, in particular, the heating operation using for example a gaseous fuel is not suitable for obtaining an optimum firing atmosphere, which in many cases should be an oxidising atmosphere. In addition, processes involving fritting by radiation require protracted fritting periods.

It has been proposed to heat ceramic products to their fritting temperature by the dissipation of energy generated within a non-conductive substance by the application of a hyperfrequential electro-magnetic field. It is known that such dissipation of energy is governed by the formula:

$$P = K.f.\epsilon_r. \tan \delta.E^2$$

wherein
$P$ is the dissipation of energy per unit of volume of the non-conductive substance;
$K$ is a constant;
$f$ is the frequency of the applied field;
$\epsilon_r$ is the relative dielectric constant of the non-conductive substance;
$\delta$ is the loss angle of the non-conductive substance;
$E$ is the electric field (in V/m).

Furthermore, it is known (Technical Reports 182 & 203 -Laboratory for Insulation Research - Massachusetts Institute of Technology) that the values of $\epsilon_r$ and $\tan \delta$ which at normal temperatures are usually very low for the components of ceramic products, and in particular for refractory oxides, increase rapidly with temperature, so that it appears to be possible to dissipate sufficient energy to cause fritting of ceramic products exposed to microwave heating, subject to the condition that the frequency $f$ is sufficiently high.

Tests have shown that it is thus possible to raise alumina-based ceramic products to the fritting temperature, by exposing the products to a hyperfrequential electro-magnetic field of 2450 mc/s, the initial rise in temperature being induced by incorporating in the ceramic composition additives which are rapidly heated within a hyperfrequential electro-magnetic field. A small proportion of aluminium powder may be incorporated in the ceramic composition as a suitable additive.

Such a fritting process overcomes the disadvantages associated with conventional methods involving heating by radiation. In particular, the bulk of the refractory supports and the refractory insulating material is considerably reduced.

For example, it is possible to form a transit furnace by means of a microwave waveguide having a small cross-section matching the size of the products to be fritted, wherein a conveyor carries one or more lines of ceramic products. Although the metal walls of the waveguide are usually situated a small distance from the products to be fritted, it is not usually necessary to insulate the walls against heat, it being sufficient to cool the walls externally if necessary, for example by ventilation. In fact, the walls are heated solely by the radiation of the ceramic products to be fritted, which constitutes a relatively small heat input.

The heat insulating materials required in gas-heated high-temperature furnaces are thus no longer required, and the refractory supports for the products to be fritted are minimized. The furnace atmosphere is not, however, changed in any way by this heating method.

Nevertheless, the fritting of ceramic products within a hyperfrequential electro-magnetic or microwave field has the following disadvantages:

Even by incorporating additives in the ceramic composition, the rise in temperature is initially very slow, with the result that for example more than three-quarters of the total period of the operation is required to raise a product to be fritted to a temperature which is less than half the fritting temperature.

Special precautions must be taken to ensure homogenous heating of the products to be fritted, and to control a rapid increase in the heating action close to the fritting temperature.

Excessive heating of the supports on which the products to be fritted rest within the furnace should be prevented, and the magnitude of the thermal shocks undergone by these supports and by the products to be fritted should be minimized.

The present invention in one aspect provides a process for fritting ceramic products wherein the products to be fritted which have been preheated to a given temperature are directly exposed to an electro-magnetic field to raise the products to a temperature which causes fritting.

The process according to the present invention particularly relates to the fritting of ceramic products, in particular of small ceramic products fritting at a high temperature, and including additives if appropriate.

The invention in another aspect provides a plant for carrying out the process according to the invention, comprising a preheating furnace heated by electrical resistances, an automatic feed device for placing the products to be fritted on a conveyor having a controllable speed and feeding the products to the said preheating furnace, a waveguide downstream of the said furnace in which the products are exposed to a hyperfrequential electro-magnetic field, a device for transferring the preheated products from the preheating furnace onto a conveyor having a controllable speed and feeding them to the said waveguide through which the products to be fritted pass, the products to be fritted being supported on fritting bearers consisting of materials the dielectric losses of which are low during operation.

In the plant according to the invention the limitation of the temperature reached by the supports for the products to be fritted is improved, and also the heat treatment of these products may be controlled to obtain fritting of optimum quality.

This invention provides a plant wherein, except for openings allowing passage of the products, the waveguide is closed at each end by a plate of electrically conductive material in electrical contact with the other walls of the waveguide, whereby a system of stationary waves may be established within the waveguide to promote a suitable resonance mode for the treatment of the products to be fritted.

The waveguide is preferably generally cylindrical, more preferably of circular cross-section, to promote the energisation of "TM" modes when the products to be fritted are translatorily displaced within the waveguide.

The invention will be further described, by way of example only, with reference to the accompanying drawings, in which.

Figure 1:
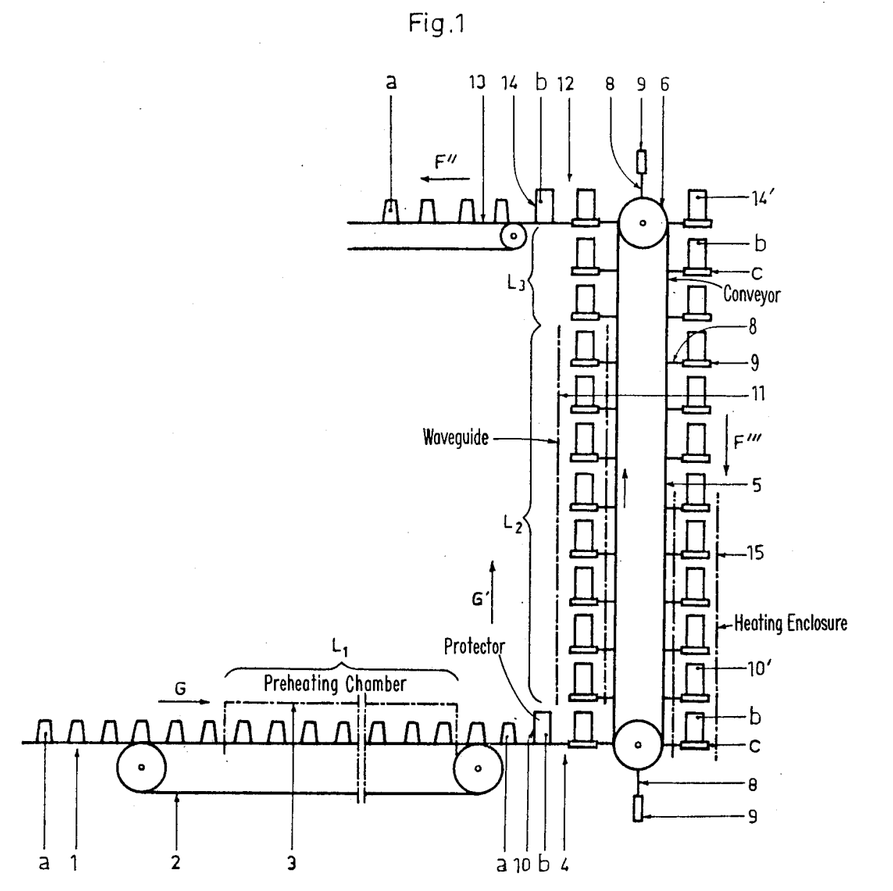
FIG. 1 is a diagrammatic elevational view of a plant in accordance with the invention for fritting ceramic products.

The plant shown in FIG. 1 is intended for fritting alumina insulating components which form parts of sparking plug assemblies for internal combustion engines. These insulating components have a substantially frustoconical shape.

The products $a$ to be fritted are transferred by a feed device 1 (not illustrated in detail) onto the upper horizontal run of an endless belt 2 which carries the products in the direction indicated by arrow G through a reverberatory preheated chamber 3 (indicated by broken lines) of a conventional electrical furnace heated by means of resistances, for example molybdenum silicide resistances. The furnace allows the products to be heated without difficulty to for example close to 1000° C. At this temperature, devices for handling the products $a$ within the furnace and at its outlet may be produced from relatively low-quality materials, such as refractory steels, and it is unnecessary to employ complex, bulky and expensive materials which are necessary at higher temperatures.

The furnace 3 has a length $L_1$, and at the furnace outlet the products $a$ are transferred by means of a transfer device 4 (not illustrated in detail) onto the rising vertical section 5 of a chain conveyor 6 which carries preferably circular refractory bearers 7 (FIG. 2) each comprising a lug or rod 8 and a plate 9. Each rod 8 and associated plate 9 are produced from, for example, fritted alumina of high purity.

Figure 2:
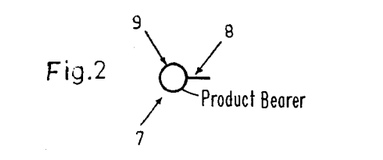
FIG. 2 is a diagrammatic plan view of a fritting support.

At a position 10, just before being transferred onto the plates 9 of the conveyor 6, the products $a$ are each capped by a protector $b$ having the form of an inverted pot, the protectors $b$ also being produced from alumina of high purity. The protectors are withdrawn at a point 10' from the descending section of the conveyor 6, and the transfer of a protector $b$ from the position 10' to the position 10 is effected automatically.

The products $a$, which have been preheated in the furnace 3 and covered by protectors $b$, are displaced in the direction indicated by arrow G' by the rising section of the vertical conveyor 5 into a waveguide 11 having a length $L_2$. The products $a$ are heated to the fritting temperature within the waveguide 11 by means of an ultra-high frequency electrical field within the waveguide, for example having a frequency of 2450 mc/s.

The speed at which the products to be fritted pass through the waveguide is adjustable, and this speed may be constant or variable. The means for driving conveyor 6 are not shown in FIG. 1.

Downstream of the outlet of the waveguide 11, the products $a$, which are then fritted, are considerably cooled along a path of length $L_3$ before being transferred by an automatic device 12 (not illustrated in detail) to a discharge conveyor 13. When a product $a$ is situated at a position 14 immediately prior to being transferred to the conveyor 13, the protector $b$ is automatically removed and conveyed to a position 14' on the upper portion of the descending section of the conveyor 5.

The time $t_2$ required for the product $a$ to travel along the length $L_2$ is much shorter than the time $t_1$ required to travel along the length $L_1$, $L_1$ being much greater than $L_2$.

Nevertheless, since the product $a$ which enters the waveguide 11 has a dielectric constant $\epsilon_r$ and a loss angle $\delta$ which are high by virtue of its preheating in the furnace 3 and, if appropriate, by virtue of any additives incorporated therein, it is raised to the fritting temperature during its short passage through the waveguide. In contrast, the temperature of the supports 7 and the protectors $b$ which are made of high-purity alumina is kept relatively low by means which will be described below, and have relatively low dielectric constants and loss angles on entering the waveguide, and will thus undergo little heating during their short passage through the microwave field.

Thus, in contrast to what occurs within conventional fritting furnaces, not only are the high-grade refractory products that are co-ordinated with the products to be fritted reduced to the supports 7 and protectors $b$, but they are also applied in conditions such that their durability is much greater than that of the refractory materials applied in conventional high-temperature furnaces.

The metal wave-transmission surfaces, protected against the thermal radiation of the products $a$ by means of the plates 9 and the protectors $b$, are heated to a moderate degree only and their outer surfaces may be easily cooled, for example by ventilation. Accordingly, no problems arise in respect of deterioration by thermal action of the waveguide and its ancillaries, nor of the conveyor 5.

Consequently, it is apparent that the fritting process in accordance with the present invention allows all disadvantages arising in high-temperature fritting in accordance with conventional processes to be overcome, which disadvantages increase the cost of the operation to an unacceptable degree, particularly in the case of units of small size.

The function of the protectors $b$ together with the plates 9 is not only to protect the waveguide 11 against the thermal radiation of the products $a$, but also to limit the heat losses of the products $a$ by radiation as well as convection. The convection currents may even be totally eliminated if the enclosure formed by the plate 9 and the protector $b$ can be practically hermetically sealed, that is, when the product $a$ is not in contact with the furnace atmosphere.

While it is desirable for the temperature of the protectors $b$ and of the plates 9 to be lower than that of the products $a$, it is, however, undesirable for the temperature difference to be too great, in order to prevent shock heating upon depositing the product $a$ on the plate 9 and in order to generally limit heat exchange between the products $a$ and their immediate environment.

Consequently, a compromise must be found in respect of the temperature of the protector $b$ and the plate 9 entering the waveguide, and the plant preferably includes means for controlling this temperature. This temperature control means preferably comprises a heat-insulated enclosure surrounding the descending section of the conveyor 5, in which the flow of fresh air may be controlled. The cooling of the protectors $b$ and the plates 9 may be thus controlled between the inlet and outlet of the waveguide 11.

However, this cooling action will often be too severe because of the very low thermal inertia of the protectors $b$ and plates 9. It is then necessary to provide a heating sheath 15 in which the protectors $b$ and sheaths 9 will be heated by any appropriate means, for example by the radiation of electrical resistances, disposed along the lower portion of the descending section of the conveyor 5. This heating means should be controllable identically to the cooling control means.

Figure 3:
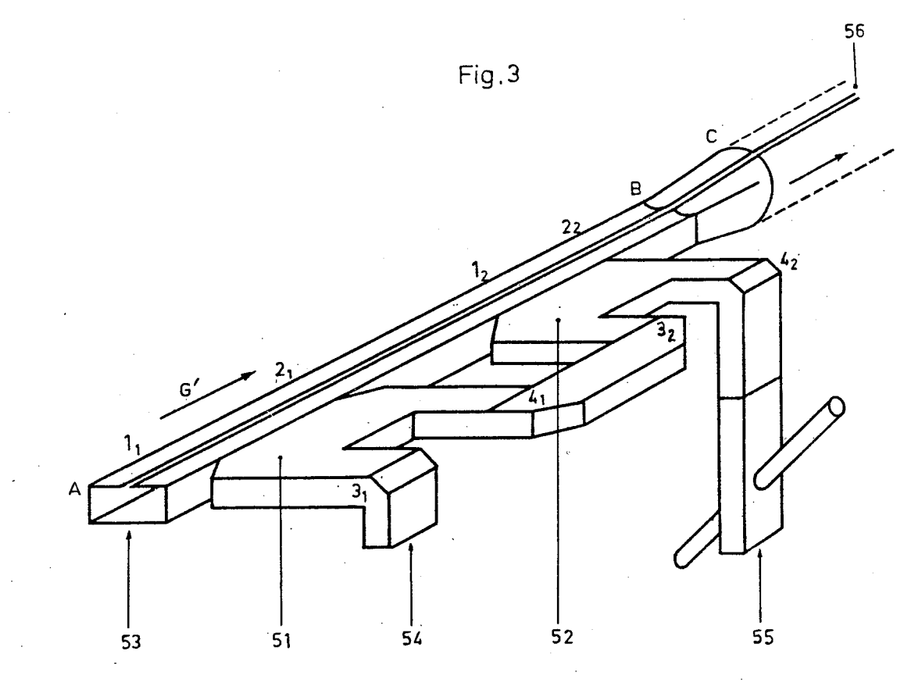
FIG. 3 is a perspective view of a feed device of the waveguide forming part of the plant shown in FIG. 1.

FIG. 3 shows the feed or intake device of the waveguide 11. The primary waveguide comprises a portion AB of rectangular cross-section, the cross-sectional dimensions being suitable for the propagation of ultra-high frequency waves of the applied wavelength.

A portion BC comprises a transition portion between the intake portion AB of rectangular cross-section and the principal waveguide portion beginning at C which is of circular cross-section. The diameter of the portion of circular cross-section is equally suitable for the propagation of the ultra-high frequency waves.

Portions 51 and 52 respectively correspond to a first and second connector, the functions of which will be described below.

The products to be fritted enter the waveguide through an inlet 53 and are displaced within the waveguide in the direction of the arrow G'. FIG. 3 also shows an input cross-section 54 for micro-waves carrying the potential energy and originating from a magnetron (not shown), a possible charge of water 55 the function of which will be described below, and a slot 56 extending along the length of the waveguide, the function of the slot 56 being to provide a passage for the rods 8 connecting the plates 9 to the chain of the conveyor 5.

References $1_1$, $2_1$, $3_1$ and $4_1$ on the one hand and reference $1_2$, $2_2$, $3_2$ and $4_2$ on the other, respectively denote reference points on the first and second connectors 51 and 52 respectively. These reference points will be referred to in the description of FIG. 4, of the intake device of the waveguide illustrated in FIG. 3.

Figure 4:
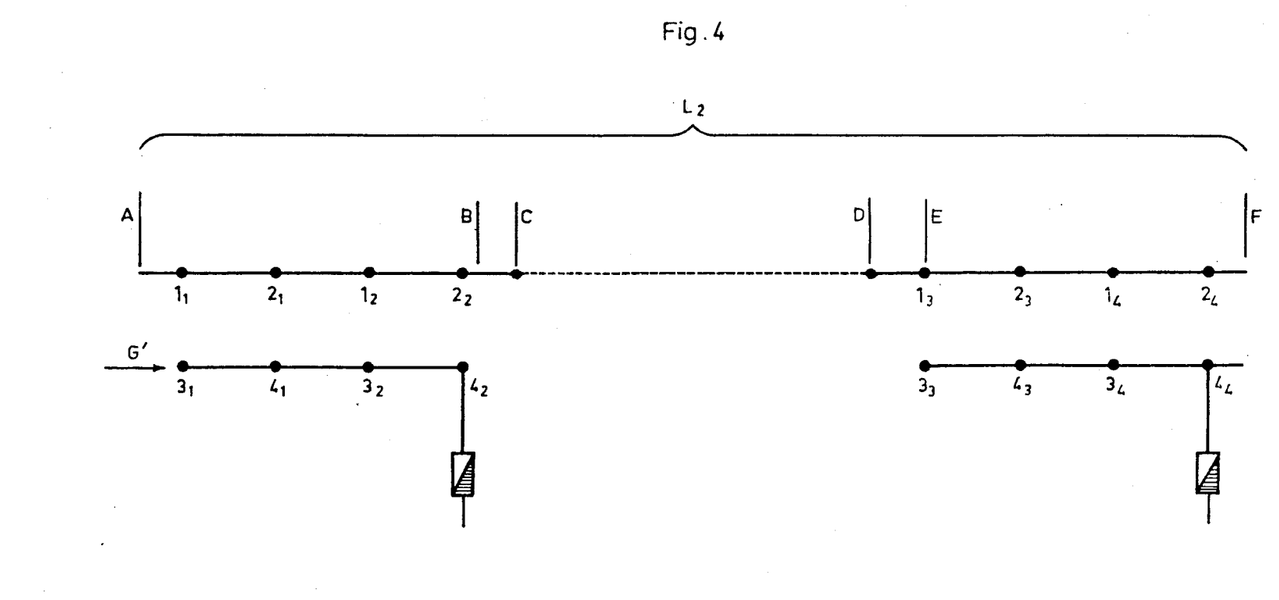
FIG. 4 is a diagrammatic view of an assembly formed by the ultra-high frequency waveguide and its feed connectors.

In FIG. 4, the waveguide is represented by a straight line AF. Moving in the direction of the arrow G' from the inlet A are the component parts illustrated in FIG. 3, i.e. the portion AB of rectangular cross-section, the references $1_1$, $2_1$, $1_2$ and $2_2$, then the transitional portion BC and finally, beginning at C, the waveguide of circular cross-section which extends from C to D along the greater part of the length $L_2$.

The assembly formed by the first and second connectors 51 and 52 is represented by a straight-line segment parallel to the straight line AF, with the references $3_1$, $4_1$, $3_2$ and $4_2$. A possible charge of water is represented symbolically below the reference $4_2$.

This assembly allows the transmission of the ultra-high frequency waves with appropriate phase shifts, in such a manner as to obtain the following results.

The energy fed in at $3_1$ is divided into two equal parts between $2_1$ and $4_1$, and there is no energy at $1_1$, with the result that the ultra-high frequency energy does not escape via the open extremity of the waveguide at which the products to be fritted enter.

Upon leaving the assembly, the energy fed in at $3_1$ appears again at $2_2$ as governed by the efficiency of the connectors, no energy being received by the gate $4_2$. The ultra-high frequency energy fed in at $3_1$ is thus transmitted in the direction of the arrow G' without escaping either at $1_1$ or at $4_2$. It is thus possible, in respect of the transmission of the ultra-high frequency energy, to obtain the same result as though the magnetron were directly connected to the inlet of the waveguide, but without impeding the insertion via this same inlet of the products to be fritted.

At the extremity of the portion CD of circular cross-section there is another transitional portion DE symmetrical to BC and providing a transition from the portion CD of circular cross-section to a portion of rectangular cross-section. There is then a second assembly identical to the intake assembly, apart from the primary waveguide bearing the references $1_3$, $2_3$, $1_4$, $2_4$, and comprising third and fourth connectors bearing the references $3_3$, $4_3$, $3_4$ and $4_4$, a charge of water being represented symbolically below the reference $4_4$. Upon leaving this second assembly, the residual energy which is not used for the fritting operation appears at $4_4$, no energy being received at $2_4$. The residual ultra-high frequency energy does not therefore escape via the outlet of the waveguide for the products to be fritted, and is absorbed at $4_4$ by a charge of water.

The sections $2_1$, $1_2$ and $4_1$, $3_2$ have been assumed to be identical, in the foregoing. It is, however, possible for these sections to be different, which would cause a phase imbalance between $1_2$ and $3_2$ reducing the energy level in $2_2$ and causing a greater energy level than zero in $4_4$, where a charge of water would then have to be provided to absorb this energy. Thus there is provided a means for metering the energy fed into the waveguide.

The assembly depicted in FIG. 4 enables the ultra-high frequency energy to be fed into the waveguide and to meter the energy without obstructing the flow of the products to be fritted and without allowing the ultra-high frequency energy to escape. Moreover, this assembly has a level of stationary oscillations which is sufficiently low to avoid the risk of damaging the generating magnetron.

Furthermore, the circular shape of the cross-section of the waveguide along the portion CD ensures that the action of the hyperquential electro-magnetic field is symmetrical with respect to the axis of the bodies formed by the products $a$, which contributes to the regular heating undergone by the products.

It may be advantageous to provide for transverse displacement of the products $a$ within the hyperfrequential electro-magnetic field, so as to neutralise possible variations in the intensity of the field in the plane at right angles to the axis of the waveguide. This transverse displacement may be obtained by imparting a degree of transverse mobility to the supports 7 with respect to the chain of the conveyor 5, for example by connecting the supports 7 to the chain of the conveyor by means of deformable parallelograms and by modifying the shape of these parallelograms throughout the length of the waveguide by means of a stationary cam surface.

Ceramic products $a$ other than the insulating units of spark plugs may be fritted by the process described above, for example carriers for electronic circuits and ceramic tiles for floor and wall coverings.

The various parts of the plant may be arranged in a different manner. For example, the conveyor 5 and the waveguide 11 could be horizontal and constitute an extension of the conveyor 2 and furnace 3, or the conveyor 5 and waveguide 11 could be positioned laterally with respect to the conveyor 2 and furnace 3.

Figures 5, 5A, 6:
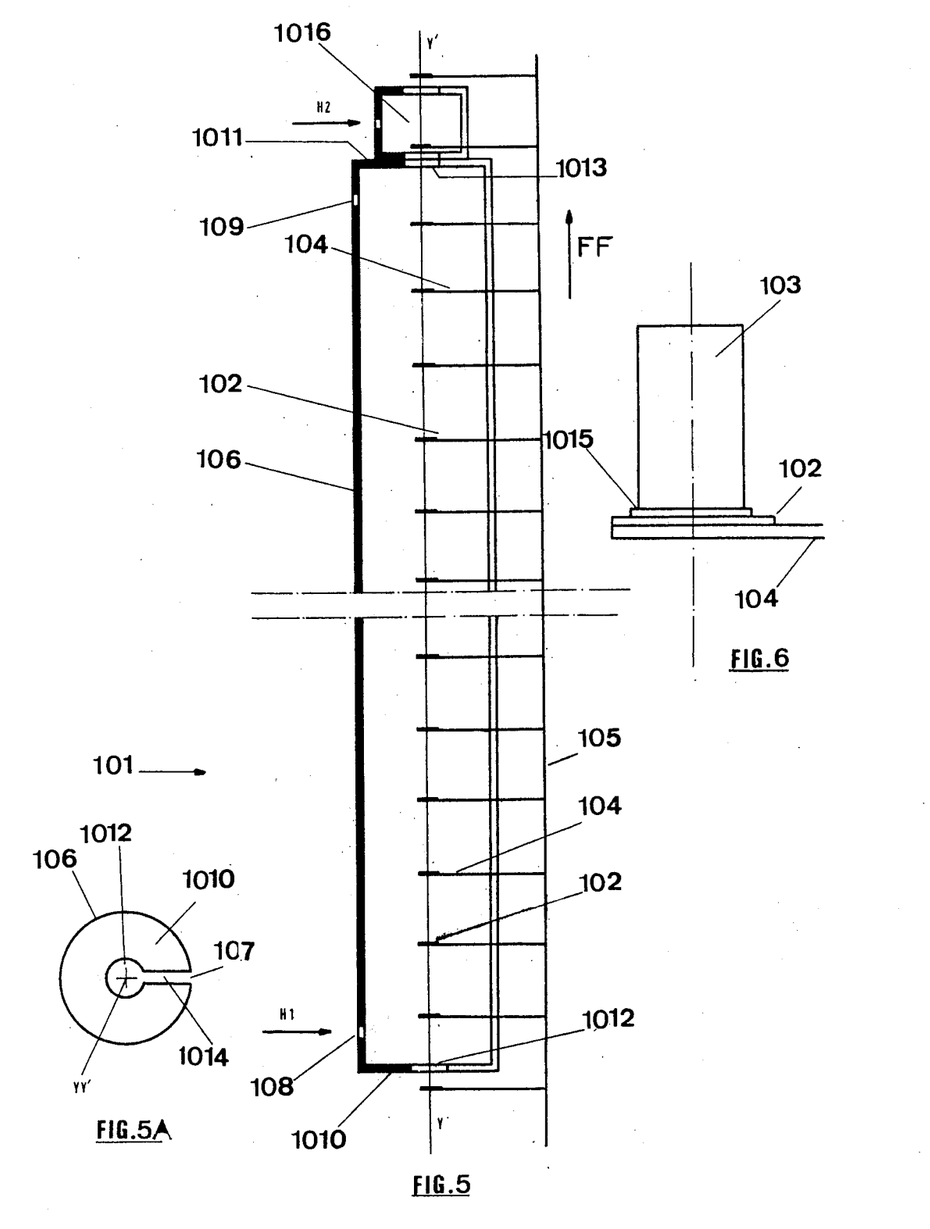
FIG. 5 is a diagrammatic view in axial cross-section of a waveguide forming part of the plant shown in FIG. 1.
FIG. 5a is a bottom view of the waveguide shown in FIG. 5.
FIG. 6 is a diagrammatic side view on an enlarged scale of a product which is to be fritted, the product being positioned on its support.

FIGS. 5, 5a and 6 show a waveguide 101 which has a circular cross-section around a longitudinal axis YY'. The longitudinal axis YY' is for example, vertical and along this axis are displaced bearers 102 formed by plates at right angles to the axis YY', on which plates are placed products 103 to be fritted. The bearer plates 102 are connected by lugs 104 to a conveyor 105 which is displaceable in the direction indicated by the arrow F.

The wall 106 of the waveguide parallel to the longitudinal axis YY' is provided with a slot 107 extending along the length of the waveguide. The wall 106 is also provided in the plane defined by the axis YY' and the slot 107 and diametrically opposite the same, with two orifices 108 and 109 respectively situated at the two ends of the waveguide. The orifice 108 serves for feeding the ultra-high frequency energy laterally into the waveguide via a connector (not shown), and the orifice 109 serves for laterally withdrawing residual ultra-high frequency energy via a connector (also not shown).

The extremities of the waveguide are closed off by walls 1010 and 1011 at right angles to the axis YY', the walls 1010 and 1011 being of an electrically conductive material and being in electrical contact with the wall 106. In the walls 1010 and 1011 are situated apertures 1012 and 1013 respectively to provide a passage for the bearer plates 102. The area of the apertures 1012 and 1013 is small compared with the area of the walls 1010 and 1011.

The slot 107 in the wall 106 communicates with the apertures 1012 and 1013 by radial slots 1014 in the walls 1010 and 1011.

The walls 1010 and 1011 enable a system of stationary waves to be established within the waveguide, the waveguide then acting as a cavity. It is thus possible to establish concentrations of energy at preferred locations within the waveguide. While applying a much lower ultra-high frequency energy, it is then possible to obtain at these preferred locations an intensity of the hyperfrequential electro-magnetic electrical field at least equal to the intensity of the field obtained practically uniformly throughout the waveguide by application of much greater energy in the case of a waveguide which is open at its extremities and consequently traversed by non-stationary waves.

The preferred locations at which these concentrations of energy are obtained should coincide with the position of the products to be fritted, and the waveguide is then devised to promote the energisation in the most appropriate mode for the treatment of the products to be fritted. If the products are displaced translatorily within the waveguide, it is preferable to promote the energisation within the waveguide of a "TM" mode corresponding to a hyperfrequential electro-magnetic field of which the electric field intensity is constant parallel to the axis YY' of the waveguide. More particularly, in the case of products in the form of solid cylinders or prisms close to the axis of the waveguide the longer dimension of the products being parallel to the axis of the waveguide, it is advantageous to promote the energisation of the "TMO 10" mode. This mode corresponds to a hyperfrequential electro-magnetic field the intensity of which is constant along the axis and at a maximum close to this axis, and decreases with increasing distance from the axis to become zero in contact with the wall 106.

It is possible to calculate the limiting values between which the internal diameter of the circular waveguide 101 should remain to promote the energisation of the "TMO10" mode at the expense of other modes. It is found that to prevent the energisation of the "TM 110" mode, when the applied frequency is 2.45 Gc/s, the diameter should be less than 15 cms, and to prevent the energisation of the "TMO20" mode the diameter should be less than 21 cms. Moreover, the "TMO 10" mode cannot be established unless the diameter is greater than 9 cms. Consequently, a waveguide of which the internal diameter lies between 9 and 15 cms will promote the energisation of the "TMO 10" mode to the exclusion of other modes which correspond to less favourable distributions of the hyperfrequential electro-magnetic electrical field, when the products to be fritted are solid cylinders or prisms. If the waveguide is provided so as to act as a sounding cavity, its diameter is set up at 92 mm so that the TMO10 mode can be excited.

In the case of the "TMO 10" mode, the lines of electric current traversing the conductive walls of the waveguide are directed along the generatrixes in the wall 106, and along the radii in the walls 1010 and 1011. This has the result that the slots 107 and 1014 do not intersect these lines of current, and therefore do not form the locus of transmissions causing energy losses, and have practically no disturbing effect on the configuration and intensity of the field within the waveguide. On the contrary, the lines of current corresponding to the "TM110" and "TMO20" modes would intersect the slots 107 and 1014 so that these slots provide a means (if required) of inhibiting the energisation of the "TM110" and "TMO20" modes in favour of the "TMO 10" mode.

The application of a circular waveguide closed at both ends, having a diameter between 9 and 15 cms (for a frequency of 2.45 Gc/s) and slotted along a radial plane, ensures an optimum concentration of the hyperfrequential electro-magnetic field close to and uniformly along the axis of the waveguide, which corresponds to optimum use of the ultra-high frequency energy fed into the waveguide, when the products to be fritted are displaced translatorily along the axis of the waveguide.

In the case of the "TMO10" mode, thin plates of dielectric material placed within the waveguide at right angles to its axis YY' undergo practically no heating by the hyperfrequential electro-magnetic field. For example, if the bearer plates 102 consist of thin plates of alumina, they will not be heated by the direct action of the hyperfrequential electro-magnetic field, but only because of the closeness of the product to be fritted which will be heated more satisfactorily the more parallel its greatest dimension is to the axis YY'. This, together with the cooling of the bearers 102 outside the waveguide, allows excessive heating of the bearers to be prevented.

In the case of the "TMO10" mode, it is also possible to arrange the bearers 102 at right angles to the axis YY' of an electrically conductive material, without any resulting disturbance in the distribution and intensity of the field, provided that the plates 102 are thin. For example, the bearer plates 102 may advantageously be produced from a refractory metal, thus assisting the cooling of the bearers outside the waveguide.

To prevent bearers 102 of conductive material from excessively cooling the part of the product 103 to be fritted which is in contact with the bearers, a layer 1015 of a heat-insulating refractory material, in particular a porous refractory material, may be interposed between the product 103 and the bearer 102.

It is known that the dielectric losses of ceramic products increase exponentially with temperature, which has the result that the heating of ceramic products within a hyperfrequential electro-magnetic field tends to become excessive, in particular close to the fritting temperature. To prevent this and to arrest the heating at the precise temperature required to obtain optimum fritting, it is necessary to be able to quickly and accurately adjust the heating action, and in particular to regulate the quantity of ultra-high frequency energy dissipated in the product to be fritted.

This may be achieved in several ways, for example, the ultra-high frequency energy fed into the waveguide may be controlled when the energy is fed via a connector such as a lateral connector, by causing the opening of the orifice 108 to vary by means of a variable diaphragm or shutter.

The energy input may also be controlled by controlling the power transmitted by the generator of the hyperfrequential electro-magnetic field, such as a magnetron or klystron. For example, it is possible to regulate the supply voltage or voltages of the generator. It is also possible to regulate the controlling modulator of the generator, so as to modify the duration of the energising pulses of the generator compared to the duration of the cycle of these pulses.

Instead of regulating the energy fed into the waveguide, it is also possible to make use of the fact that the intensity of the field decreases with increasing distance from the axis YY', in the "TMO 10" mode. It will then be sufficient to vary the distance of the products to be fritted from this axis. This may be effected by arranging the waveguide 101 so that it may tilt around an axis (not illustrated) situated close to the inlet of the waveguide and at right angles to the plane established by the axis YY' and the slot 107. It will then be sufficient to slightly tilt the waveguide to move the products to be fritted progressively away from the axis of the waveguide as the products advance within the waveguide. By this means, the power dissipated within the products to be fritted is thus progressively reduced as the dielectric losses of the products increase.

These various means of controlling the heating of the products to be fritted may be effected manually. It is, however, preferable to apply the means automatically by means of a positive linkage, preferably of an electronic nature, which is driven by a measuring apparatus. Preferably there is provided, apart from the high-power hyperfrequential electro-magnetic field H1, a second hyperfrequential electro-magnetic field H2 of low power which in a known manner enables the dielectric characteristics of the products to be fritted to be measured. Since these characteristics increase very rapidly with heating close to the fritting point, their measurement forms a logical means of controlling the heating action, and it is thus possible to drive the positive linkage with precision.

The measuring field H2 may be superimposed on the heating field H1 within the waveguide. Nevertheless, the measurement then corresponds to the mean value of the dielectric characteristics of all the products to be fritted which are present within the waveguide at the time of the measurement.

The characteristics of a particular product may be measured at a definite time during its heating, preferably by making use of a small cavity separate from the waveguide on the ultra-high frequency level, this cavity being traversed by the products. For example, as shown in FIG. 5, a cavity 1016 may be situated at the outside of the waveguide, for example at the waveguide outlet. In FIG. 5, the cavity 1016 is shown co-axial to the waveguide, but this is not necessary. The use of this small cavity allows very precise measurement of the dielectric characteristics of a given product and thus very precise and particularly satisfactory control over the positive linkage.

The measuring cavity could equally be situated between two waveguides, for example two co-axial waveguides, the first waveguide enabling the products to be fritted to be raised to a slightly lower temperature than the fritting temperature, and the second waveguide enabling the products to be raised to the fritting temperature and being controlled for this purpose via the measuring cavity.

Instead of directly measuring the dielectric characteristics of a product to be fritted, it is also possible to measure the dielectric characteristics of a control sample, the dielectric characteristics of which vary in a known manner as a function of temperature, the temperature of the control sample being affected by the proximity of the product or products to be fritted. A system comprising a control sample (for example of alumina) used as a temperature sensor and a measuring device making use of an H2 field comprises a high-grade apparatus for measurement and control of these high temperatures by virtue of the very rapid variation of the dielectric characteristics of alumina at high temperature.

What I claim is:

1. A process for fritting ceramic products, comprising preheating the products to be fritted at a given temperature, then exposing the preheated products directly to a hyperfrequential electro-magnetic field to raise the temperature of the products high enough to cause fritting of the products, and protecting the products during said fritting against losses by radiation and against thermal shocks, the maximum temperature of the protective means being less than the fritting temperature.

2. A plant for fritting ceramic products, comprising a preheating furnace heated by electrical resistance, a conveyor for carrying said products through the furnace, a waveguide downstream from the furnace, conveying means for receiving the preheated articles from the furnace conveyor and carrying them through said waveguide, said conveying means including fritting bearers for the products traveling through the waveguide, and means for subjecting said products in the waveguide to microwave heating to raise them to fritting temperature, the waveguide except for openings allowing passage of said products being closed at each end by a plate of electrically conductive material in electrical contact with the walls of the waveguide, whereby a system of stationary waves may be established within the waveguide to promote a suitable resonance mode for the treatment of the products to be fritted, the waveguide being provided with a slot extending along its length and extended into said end plates by radial slots communicating with said end plate openings, and including connectors for the lateral infeed of microwave energy at the waveguide inlet and for the escape of residual microwave energy at the waveguide outlet.

3. A plant for fritting ceramic products, comprising a preheating furnace heated by electrical resistance, a conveyor for carrying said products through the furnace, a waveguide downstream from the furnace, conveying means for receiving the preheated articles from the furnace conveyor and carrying them through said waveguide, a station at the inlet of the waveguide where said preheated products are provided with protectors, said conveying means including fritting bearers for the products and protectors traveling through the waveguide, means for subjecting said products in the waveguide to microwave heating to raise them to fritting temperature, a station at the outlet of the waveguide where said protectors are removed from the fritted products and returned to said fritting bearers, and a controlled temperature enclosure, said conveying means including an endless conveyor chain supporting said fritting bearers for carrying the protectors through said waveguide and then through said enclosure after they leave said last-mentioned station.

* * * * *